United States Patent [19]

Reeves et al.

[11] Patent Number: 4,946,587
[45] Date of Patent: Aug. 7, 1990

[54] AUTOMATED GAUGING APPARATUS

[75] Inventors: James W. Reeves, Wilmington; Harold B. King, Jr., Wrightsville Beach, both of N.C.; William M. Childers, Hartselle, Ala.

[73] Assignee: General Electric Company, San Jose, Calif.

[21] Appl. No.: 279,008

[22] Filed: Dec. 2, 1988

[51] Int. Cl.5 ............................ B07C 5/02; B07C 5/34
[52] U.S. Cl. ..................................... 209/539; 209/541; 209/542; 209/555; 209/598; 324/207.11
[58] Field of Search ........ 209/517, 518, 539, 540–542, 209/545, 555–558, 567, 570, 571, 598, 698, 706; 324/207, 208, 229

[56] References Cited

U.S. PATENT DOCUMENTS 4,437,985  3/1984  Hinds et al. ................. 209/541 X

FOREIGN PATENT DOCUMENTS 0157503  12/1963  U.S.S.R. ........................... 324/229
0482214  12/1975  U.S.S.R. ........................... 209/567

Primary Examiner—Margaret A. Focarino
Assistant Examiner—Edward M. Wacyra
Attorney, Agent, or Firm—Robert R. Schroeder

[57] ABSTRACT

To qualify the heights of inwardly projecting nuclear fuel rod-positioning stops formed in the sidewall of tubular ferrules 12 utilized in fuel bundle spacers, an automated gauging apparatus, seen in FIG. 6, is provided to handle successive ferrules on an automated basis. The apparatus includes an orienting station 32 for longitudinally reorienting each ferrule, if necessary, and angularly orienting each ferrule in a pickup position. A mechanism 68 picks each ferrule from its pickup position and places it on an arbor 84 with the rod-positioning stop surfaces bearing against arbor reference surfaces. A plurality of eddy current probes 96 (FIG. 8) are positioned to measure the proximity of ferrule peripheral surface sites adjacent the stops and thus provide output gauging signals indicative of the heights of the various stops.

16 Claims, 7 Drawing Sheets

AUTOMATED GAUGING APPARATUS

The present invention relates to gauging apparatus, and particularly to apparatus for gauging formed parts on an automated production line basis to determine if critical dimensional characteristics of the parts are within a predetermined tolerance.

BACKGROUND OF THE INVENTION

There are numerous piece part manufacturing situations where the dimensional characteristics of the finished part are of the utmost importance. That is, after a part has exited a manufacturing process, such as machining or forming, the dimensional characteristics imparted thereto by the process must fall within predetermined design limits, which may have a tolerance on order of several thousandths of an inch or less. When such parts are manufactured in large quantities on an automated production line basis at high piece count rates, quality assurance inspection can impose a serious bottleneck on production. Thus, it is not uncommon in such situations to only randomly check the finished parts for dimensional accuracy. In so doing, trends leading to process excursions can be detected and corrective measures instituted, if necessary.

However, for certain applications calling for absolute part dimensional integrity, quality assurance inspection of each and every finished part becomes a necessity. One such application is the spacer utilized in nuclear fuel rod assemblies or bundles. An example of such a spacer is disclosed in the commonly assigned, Matzner et al. U.S. Pat. No. 4,508,679. Thus, each spacer includes a multiplicity of conjoined tubular ferrules contained by a peripheral band, with each ferrule bore providing a passage or cell for receiving a nuclear fuel rod. The rods are centered in the ferrules between two axially spaced pairs of stops and a spring. The stops are formed as inwardly projecting dimpled or fluted wall segments of the ferrule. The height of these rod centering stops, measured from the ferrule peripheral surface to the rod engaging stop surfaces, is critical in order to achieve optimum positioning of the plural rods of a fuel bundle. Thus, the height of each stop of each ferrule must be inspected for quality assurance. Since each fuel bundle utilizes a multiplicity of these spacer ferrules, they must be manufactured on a mass production basis. Quality assurance inspection of the heights of the four stops of each ferrule prior to their assembly into a full rod bundle spacer in an expeditious manner so as not to impose a production bottleneck represents a formidable challenge.

It is accordingly an object of the present invention to provide gauging apparatus for measuring the dimensional characteristics of formed piece parts on an expedited, automated basis.

A further object is to provide automated gauging apparatus of the above character which is capable of inclusion in a piece part production line without imposing limitations on finished part output rate.

Another object is to provide automated gauging apparatus of the above-character which is capable of measuring the dimensions of a multiplicity of formed part features to a high degree of accuracy.

An additional object is to provide gauging apparatus of the above-character, wherein the feature measurements are compared against established quality assurance standards pursuant to determining whether or not each part is acceptable.

Yet another object is to provide gauging apparatus of the above characters, wherein the quality assurance inspected parts are automatically sorted into separate accepted and rejected lots.

Still another object is to provide gauging apparatus of the above-character, which is capable of rendering quality assurance decisions regarding the acceptance and rejection of each part in a rapid and reliable manner over sustained operating periods without human intervention.

Other objects of the invention will in part be obvious and in part appear hereinafter.

SUMMARY OF THE INVENTION

In accordance with the present invention, there is provided gauging apparatus for measuring the dimensions of multiple features formed in manufactured parts on an automated production line basis. The gauging apparatus accepts formed parts seriatim from an input queue, reorients each part end for end, if necessary, angularly orients each part to a predetermined reference position, and transfers each part in its reference position to a gauging fixture. A plurality of sensors, such as eddy current probes, mounted to the gauging fixture, measure the dimensions of the part features of critical interest. The sensor outputs are compared against quality assurance standards to determine if the feature dimensions are within design tolerances. Based on this determination, the parts are automatically sorted into accepted and rejected slots.

The invention accordingly comprises the features of construction, combination of elements and arrangement of parts, all of which are detailed in the description below and the scope of the invention is indicated in the appended claims.

For a full understanding of the nature and objects of the present invention, reference may be had to the following Detailed Description taken in conjunction with the accompanying drawings, of which:

Corresponding reference numerals refer to like parts throughout the several views of the drawings.

DETAILED DESCRIPTION

Figure 1:
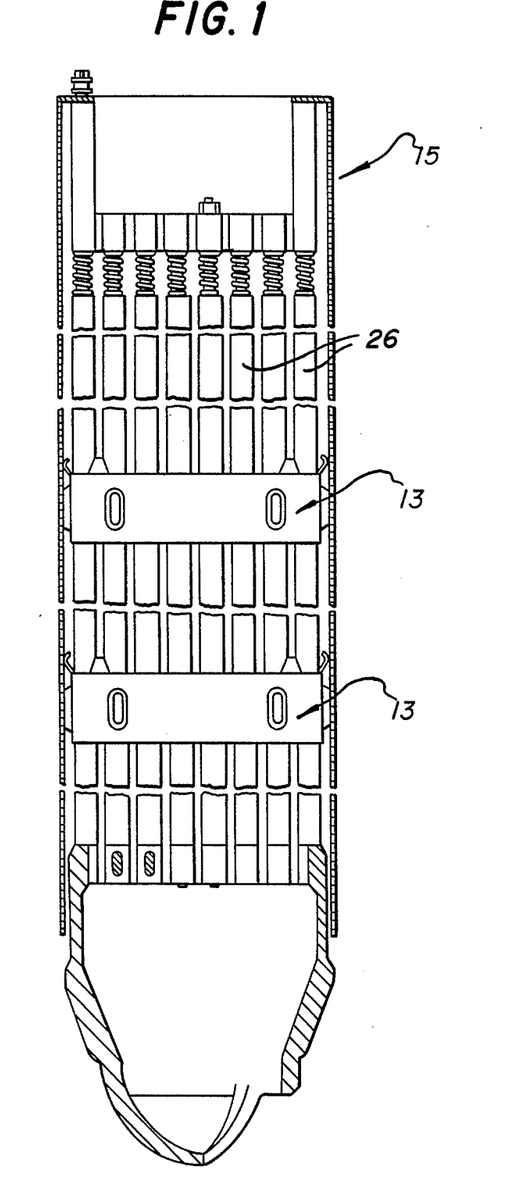
FIG. 1 is an elevation view, partially broken away, of a nuclear fuel bundle.
Figure 2:
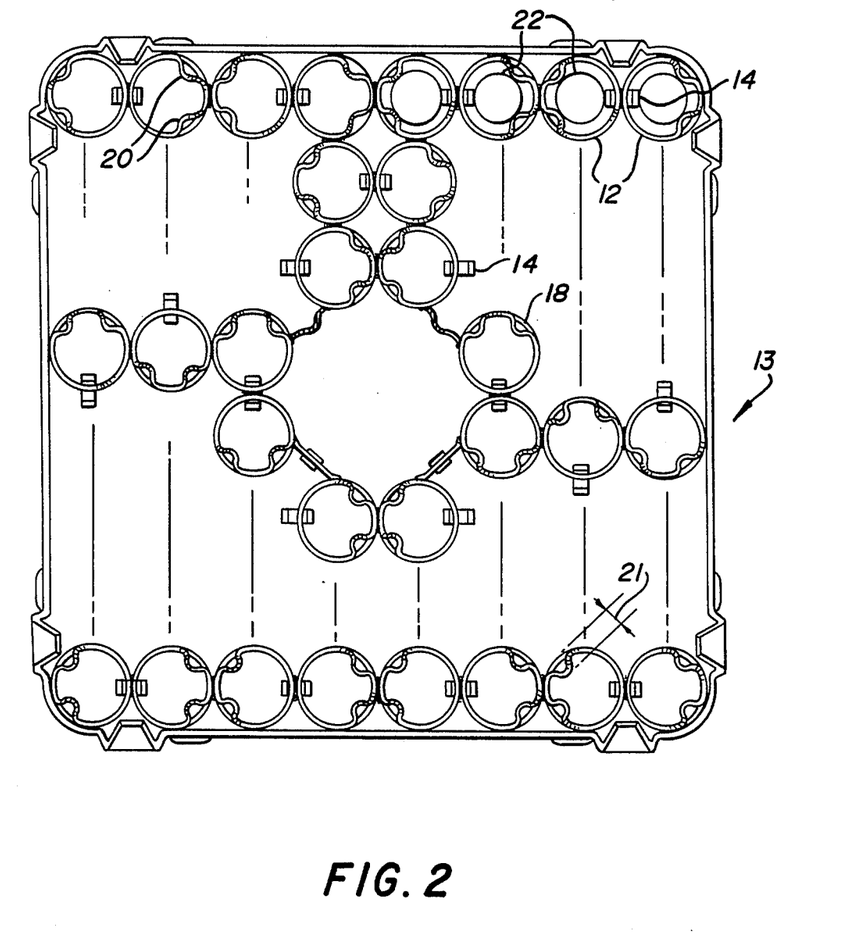
FIG. 2 is a plan view of a spacer utilized in the nuclear fuel bundle of FIG. 1.
Figure 3:
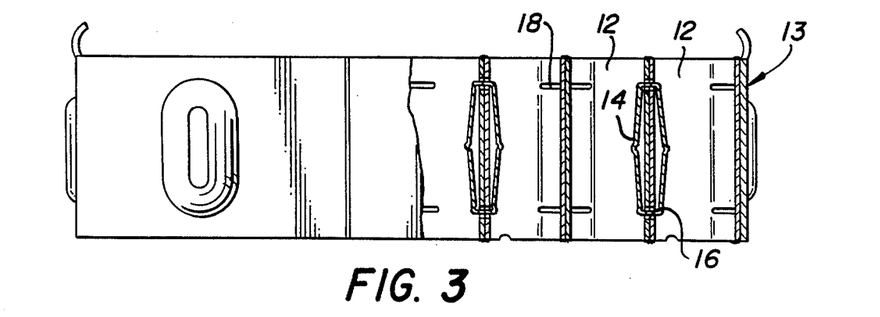
FIG. 3 is a side view of the nuclear fuel bundle spacer of FIG. 2.
Figure 4:
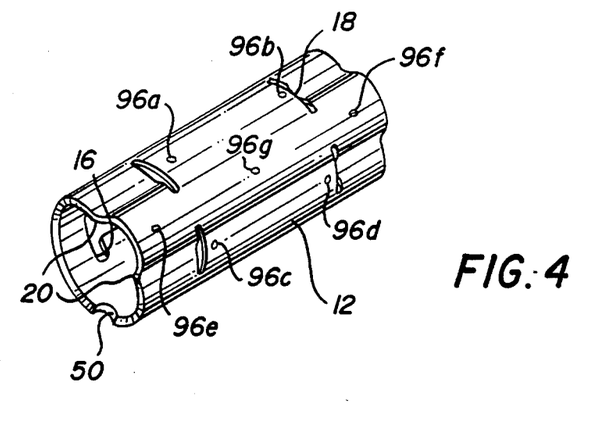
FIG. 4 is a perspective view of a nuclear fuel rod-positioning ferrule utilized in the spacer of FIGS. 2 and 3.

The automated gauging apparatus of the present invention is disclosed in its application to qualify the stop height dimensions of a ferrule, generally indicated at 12 in FIGS. 2 through 4, utilized as one of many such ferrules welded together to provide a structurally rigid nuclear fuel rod bundle spacer, such as disclosed in the above-cited U.S. Pat. No. 4,508,679 and generally indicated at 13 in FIGS. 1-3. Suitable laser welding equipment for this purpose is disclosed in commonly assigned Muncy et al. copending application Ser. No. 394,289, entitled "System for Automated Welding of Parts Assembly in Controlled Environment" filed Aug. 14, 1989, which is a continuation of abandoned application Ser. No. 279,010, filed Dec. 2, 1988. These spacers are utilized at intervals along the length of a nuclear fuel bundle, generally indicated at 15 in FIG. 1, to provide intermediate support retaining a plurality of nuclear fuel rods 22 in spaced relation. Each ferrule is cylindrical in shape as cut from seamless metal tubing of a low neutron absorption cross section, such as a zirconium alloy. The ferrules are initially assembled in pairs, as seen in FIGS. 2 and 3, with a loop spring 14 interlocked within confronting C-shaped cutouts 16 cut into the cylindrical wall of each ferrule. Suitable automated equipment for this purpose is disclosed and claimed in concurrently filed, commonly assigned Moreno et al. copending application Ser. No. 279,006 entitled "Automated Assembly Apparatus". Short circumferential slits 18 are also cut in ferrule wall to permit the forming of inwardly projecting, fluted wall sections at each ferrule end, which serve as stops 20. The creation of C-shaped cutout 16 and slits 18, as well as reference notch 50 in one edge of the ferrule, may be effected by automated laser cutting equipment such as disclosed in concurrently filed, commonly assigned Muncy et al. copending application Ser. No. 279,007, entitled "Apparatus for Machining Intricate Feature Cuts in Thin Walled Tubular Parts". Suitable automated stop forming equipment is disclosed and claimed in concurrently filed, commonly assigned King et al. copending application Ser. No. 279,009, entitled "Automated Forming Apparatus".

Each ferrule 12 is provided with four such stops 20, as best seen in FIG. 4. When a nuclear fuel rod 22 is inserted through a ferrule bore, spring 14 biases the rod against the angularly spaced pair of stops 20 as seen in FIG. 2. Thus, these stops serve to precisely position a fuel rod within each ferrule bore and, with the ferrules assembled into spacer 13, to, in turn, precisely position the multiple fuel rods within fuel bundle 15. The importance of fuel rod positioning is discussed in detail in the referenced U.S. Pat. No. 4,508,679, and thus need not be repeated herein. Since fuel rod positioning is established by the height of these stops, i.e. the radial dimension 21 (FIG. 2) measured from the adjacent ferrule peripheral surface to the fuel rod-engaging stop surface, stop height is a critical dimension in the production of ferrules 12. As such, it must be inspected for quality assurance on a 100% basis. Since a large nuclear reactor typically contains on the order of 800 fuel bundles, each with as many as seven spacers 13, each containing as many as sixty ferrules 12, absolute quality assurance of stop height integrity involves a vast multitude of dimensional checks which can impose a serious bottleneck to spacer production. The gauging apparatus of the present invention is uniquely constructed to perform this height dimensional check with respect to each stop of each ferrule on an automated production line basis.

Figure 5:
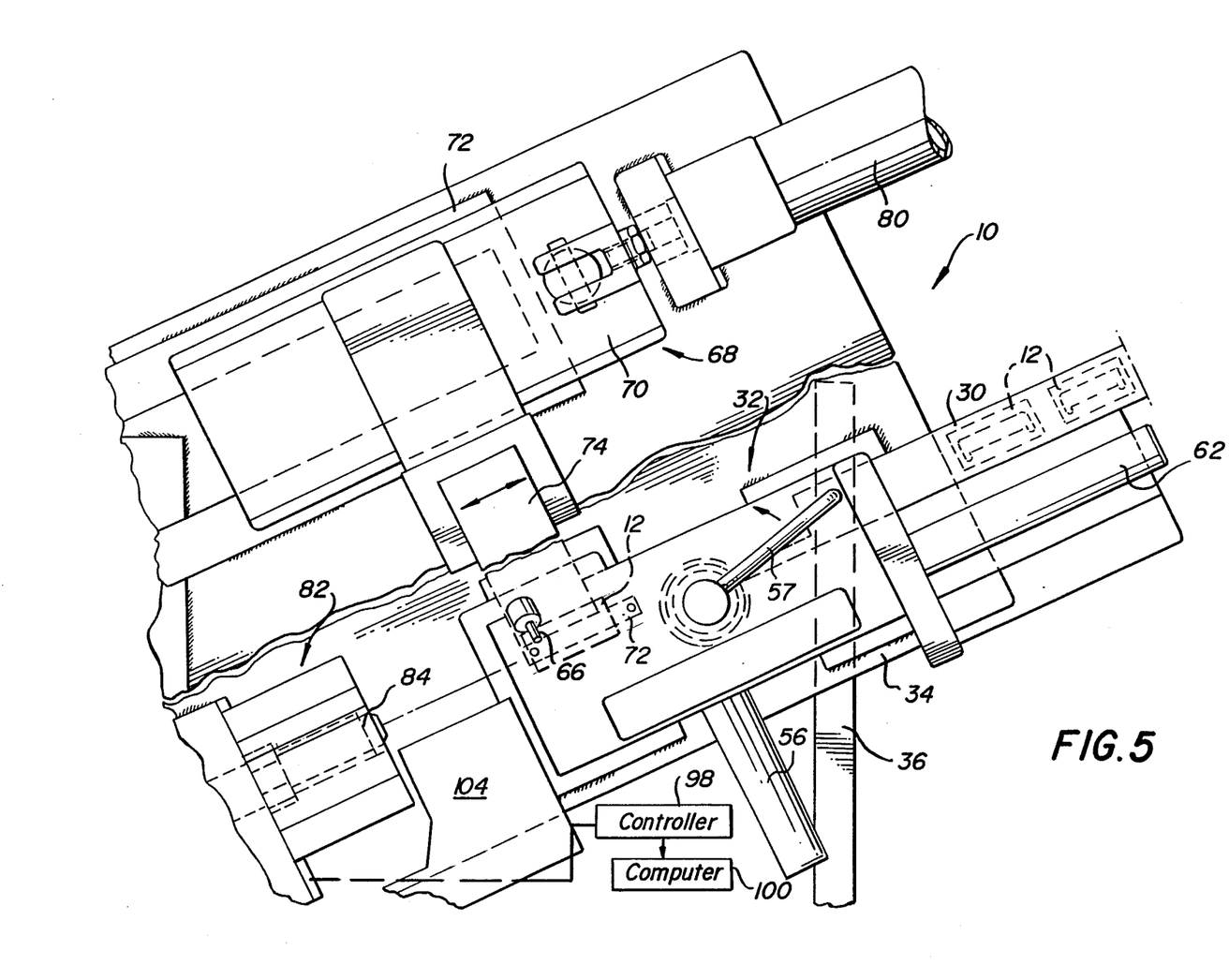
FIG. 5 is an elevation view of an automated gauging apparatus constructed in accordance with the invention for checking the critical dimensional characteristics of the ferrule of FIG. 4.
Figure 6:
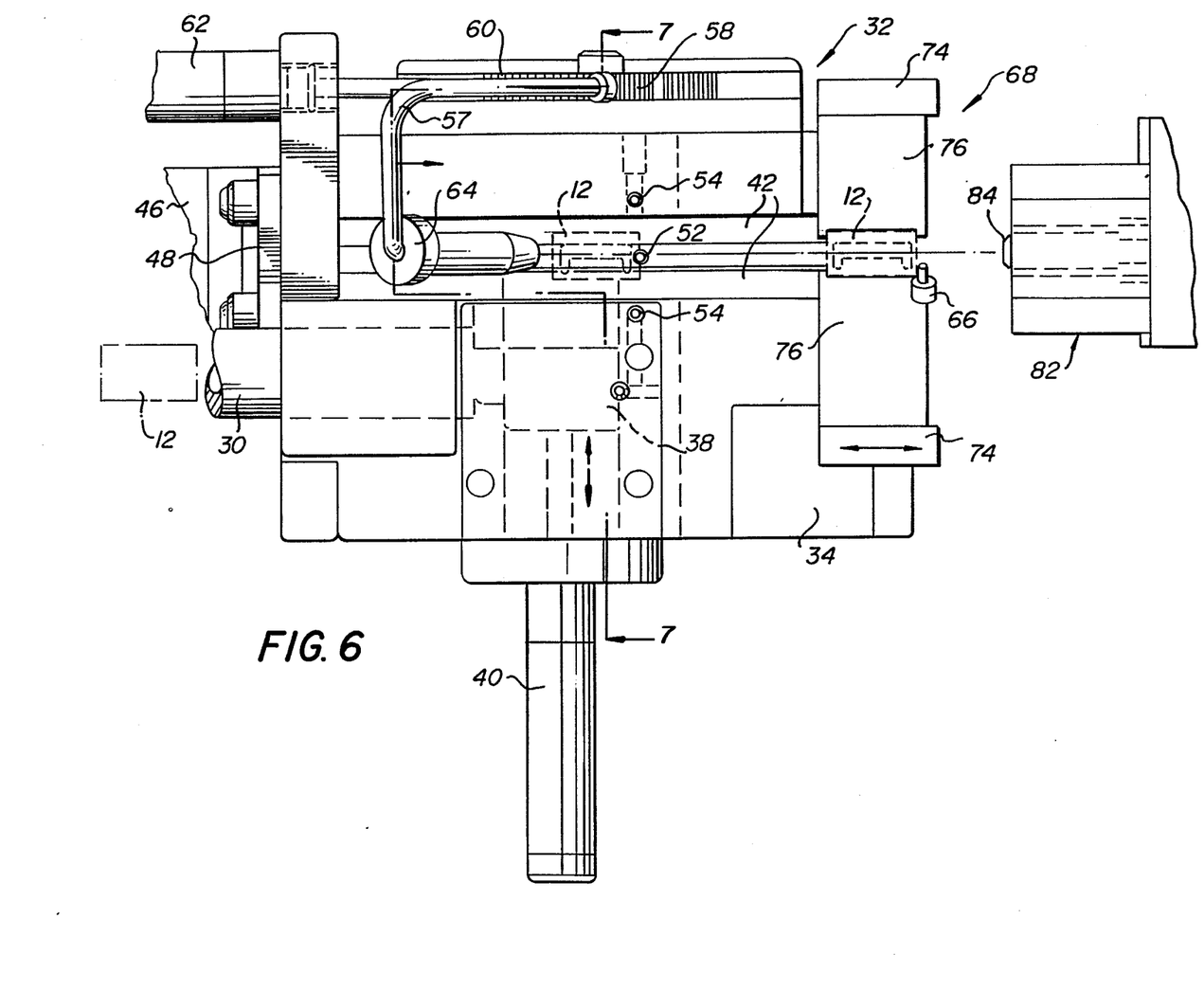
FIG. 6 is a top view of the ferrule orienting station utilized in the gauging apparatus of FIG. 5.
Figure 7:
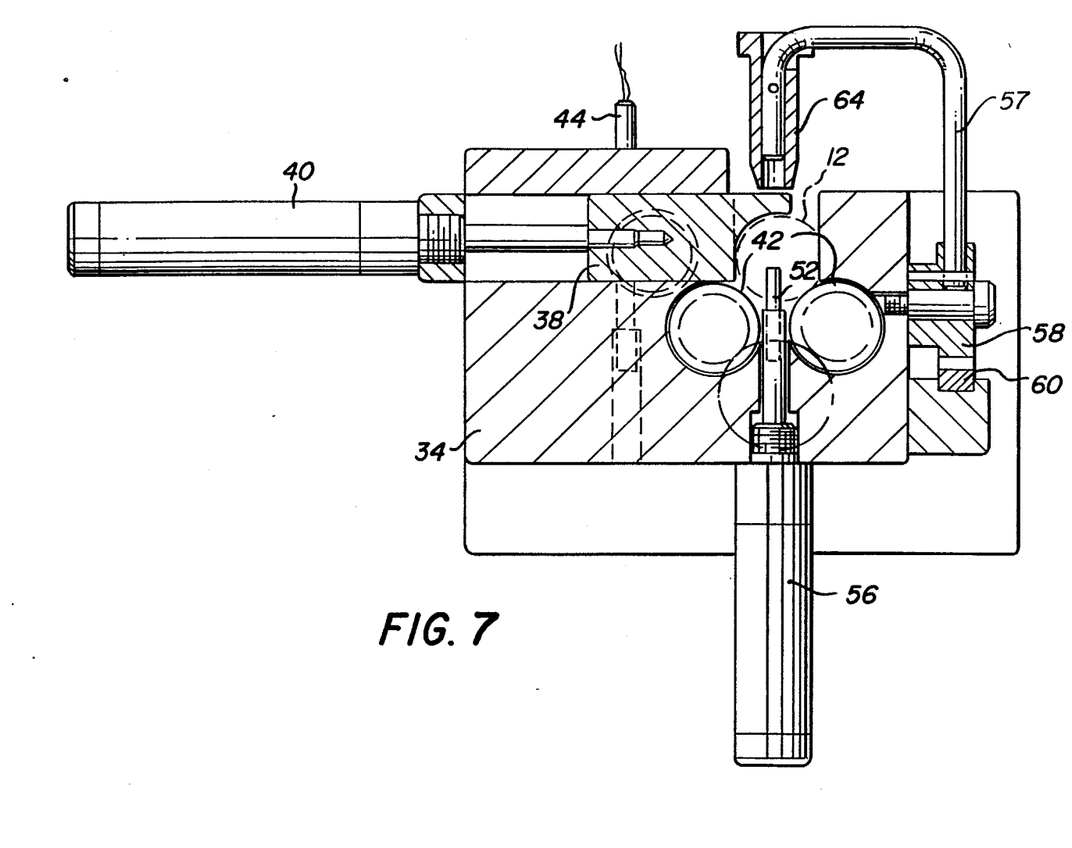
FIG. 7 is a sectional view taken along line 7—7 of FIG. 6.

Turning to FIG. 5, ferrules 12 are delivered serially to the gauging apparatus of the present invention, generally indicated at 10, through an inclined tube 30 terminating at a ferrule orienting station, generally indicated at 32. This orienting station includes a fixture 34 supported in an inclined orientation by a stand 36. As best seen in FIGS. 6 and 7, a shuttle 38 is slidingly mounted by this fixture just beyond the exit end of the chute 30 to accept each exiting ferrule 12 and laterally transfer it, upon actuation of a shuttle air cylinder 40, to a position supported by a pair of elongated rollers 42. A sensor 44 signals the presence of ferrules in the queue awaiting lateral transfer. The rollers are mounted by the fixture in inclined, closely spaced, parallel relation. A motor 46 drives the rollers in opposite directions via gearing 48, thus imparting unidirectional rotation to a ferrule supported thereon.

As previously noted, the edge at one end of each ferrule is cut to provide semi-circular notch 50 which serves as an angular reference point utilized in the forming process to precisely locate stops 20 relative to C-shaped cutout 16. Thus, rollers 42 serve to rotate the ferrule supported thereon as it gravitates toward a pin 52 upstanding between the rollers. As seen in FIG. 6, if the leading end of the rotating ferrule contains notch 50, pin 52 will quickly find and become lodged therein. A pair of sensors 54 are mounted by fixture 34 in positions to observe the ferrule leading edge and detect if the notch 50 has been found by pin 52. If it has, an air cylinder 56 is signalled to retract pin 52, and the ferrule gravitates therebeyond as supported on the rotating rollers 42.

On the other hand, if pin 52 does not find the notch, meaning that the notch is in the ferrule trailing edge, the ferrule must be inverted end for end. To effect this longitudinal reorientation, an inverter mechanism is provided to include a U-shaped arm 57 mounted at one end to a sector gear 58 journaled by fixture 34. This gear meshes with a rack gear 60 mounted by the fixture for reciprocation by an air cylinder 62. The free end of arm 57 carries a thimble 64 which is normally poised behind and in alignment with the axis of a ferrule supported on rollers 42. If reorientation of a ferrule is called for by sensors 54, air cylinder 62 is activated to reciprocate rack gear 60 such as to swing arm 57 in the counterclockwise direction seen in FIG. 5 as pin 52 is retracted. Thimble 64 is thus positioned to slip into the ferrule through its unnotched leading end as it gravitates thereto on rotating rollers 42. The air cylinder 62 then swings arm 57 in the clockwise direction, and the ferrule drops from thimble 64 onto the rollers inverted end for end. The ferrule is thus reoriented with notch 50 in its leading edge. Pin 52 remains retracted, allowing the ferrule to gravitate therepast on the rotating rollers.

Having assured the proper end-to-end orientation of the ferrule, it is then advanced by the rotating rollers 42 to a pickup position in fixture 34 established by a retractable pin 66 positioned to intercept the leading, notched end of the ferrule. Rollers 42 continue to rotate the ferrule until pin 66 finds notch 50 to capture the ferrule in its pickup position with the requisite angular orientation. A sensor (not shown) signals the rollers to stop when the notch is found by pin 66. If, after multiple ferrule inversions by the inverter mechanism, pin 52 fails to find notch 50, meaning that the notch is absent or not of the prescribed depth, pins 52 and 66 are both retraced, and the ferrule is allowed to advance through the pickup position into a reject bin.

Figure 8:
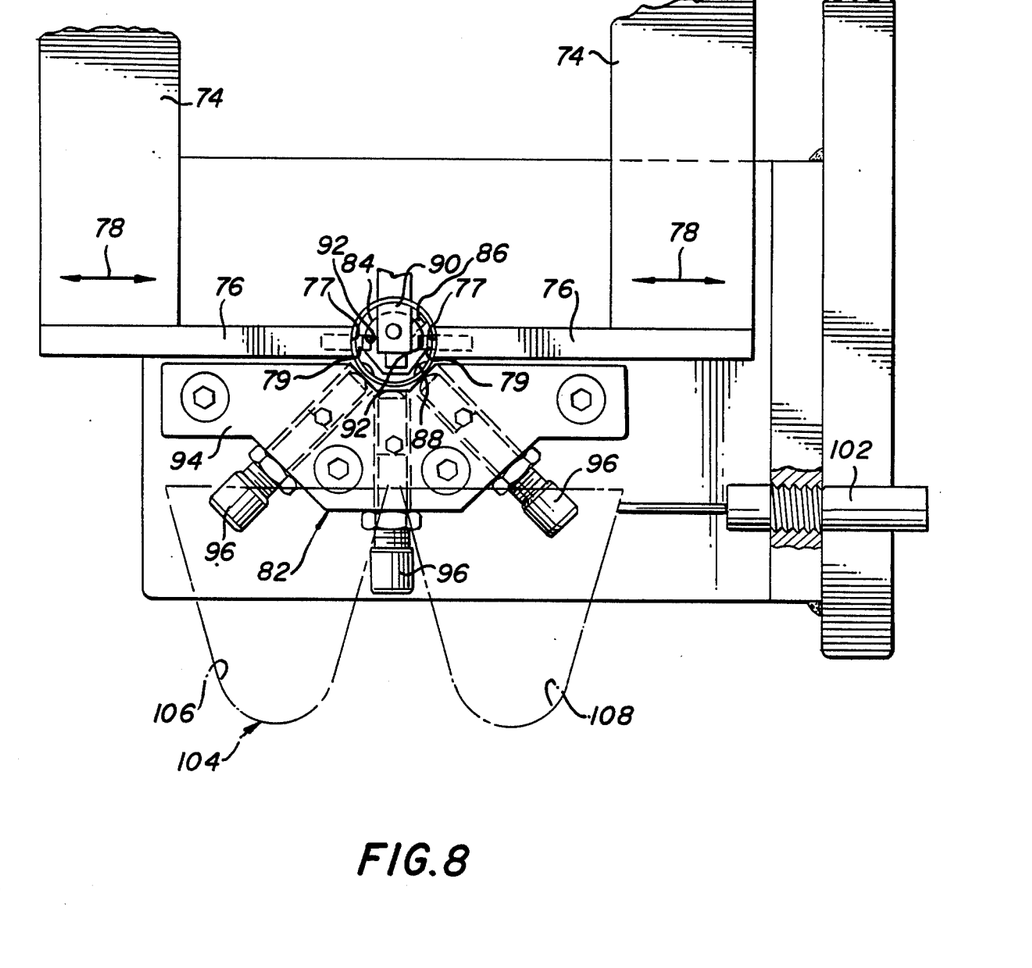
FIG. 8 is a front view of the gauging fixture utilized in the automated gauging apparatus of FIG. 5.

At this point the ferrule is fully prepared for stop height gauging. A pick and place mechanism, generally indicated at 68 in FIG. 5 is then signalled into operation. This mechanism includes a slide 70 mounted on track 72 supported by stand 36. The slide carries a pair of parallel arms 74 equipped at their free ends with converging hands 76, as seen in FIG. 8. The free end surfaces 77 of these hands are machined to closely conform to the diametrically opposed peripheral surfaces presented thereto by the ferrule in its pickup position. The pick and place mechanism is equipped with conventional means (not shown) for articulating the arms in opposite directions, as indicated by arrows 78, to bring the hand free end surfaces 77 into and out of opposed, engaging relation with a ferrule in its pickup position in fixture 34. Preferably, the hands are equipped with pairs of projecting nubs 79 spaced to closely flank the ferrule ends when a ferrule is gripped by hands 76.

To extract a properly oriented ferrule from its pickup position, hands 76 are brought into gripping engagement with the ferrule periphery, pin 66 (FIG. 5) is retracted, and an air cylinder 80 is actuated to motivate pick and place mechanism slide 70 leftward to transfer the ferrule to a gauging fixture, generally indicated at 82 in FIG. 5. It will be noted that this straight line transfer does not disturb the requisite ferrule angular orientation established in the ferrule pickup position. As a ferrule is transferred to the gauging fixture, shuttle 38 is reciprocated by its air cylinder 40 to pickup the next ferrule in the queue for lateral transfer to rollers 42, inverted end-for-end, if necessary, and advanced to the pickup position where its requisite angular orientation is imposed preparatory to gauging.

As seen in FIGS. 5 and 8, gauging fixture 82 is mounted to stand 36 and includes an arbor 84 positioned in axial alignment with a ferrule in its pickup position. Thus, the straight line transfer of a ferrule from its pickup position to the gauging fixture positions the ferrule with the arbor inserted through its bore. As seen in FIG. 8, the placement of a ferrule on arbor 84 by pick and place mechanism 68 is such that a locating dowel 86 is engaged in ferrule notch 50. This assures that ferrule stops 20 are precisely aligned with angular reference surfaces 88 of the arbor. A spring backed tongue 90, loosely keyed to the arbor, acts against the ferrule inner surface to radially position the ferrule with its stops 20 bearing against reference surfaces 88. Longitudinal grooves 92 provide clearance for nubs 79 of the pick and place mechanism hands 76 during placement of a ferrule on the arbor. Once a ferrule is positioned in the arbor, it is released by hands 76.

Gauging fixture 82 further includes a sensor block 94 mounted in closely spaced, underlying relation to arbor 84. This sensor block is provided with cavities for mounting a plurality of proximity sensors, such as eddy current probes, in predetermined, fixed positions relative to the arbor surfaces. In the illustrated embodiment of the invention seven eddy current probes 96 are utilized. Referring to FIG. 4, the positions of these probes are such that their tips are proximate sites 96a-96g on the ferrule peripheral surface. Thus, two probes are positioned with their tips proximate surface sites 96a and 96b just inwardly of one pair of longitudinally aligned slits 18, while another two probes are positioned with their tips proximate surface sites 96c and 96d just inwardly of the other pair of longitudinally aligned slits. The tips of the remaining three probes are proximate spaced surface sites longitudinally aligned mid-way between the angularly spaced pair of stops 20. Thus, surface site 96e is located between a pair of stops just inwardly of one ferrule end, while surface site 96f is similarly located between the other pair of stops. Surface site 96g is then located at the mid-length of the ferrule.

It will be appreciated that with stops 20 bearing against arbor reference surfaces 88 and knowing the spacings of the probe tips therefrom, gauging the positions of surface sites 96a-96d relative the respective eddy current probe tips provides an accurate measure of each stop height. The probings of surface sites 96e-96g detect any ferrule longitudinal distortion, i.e., lack of cylindricality.

The various operations of gauging apparatus 10 of the present invention are controlled by a programmable controller 98 serviced by a computer 100. To calibrate gauging fixture 82, the radial probe positions in sensor block 94 are established, and a plurality of standard ferrules having known stop height dimensions 21 (FIG. 2) and cylindricality are gauged. The probe outputs, converted from an analog signal to a digital count are processed by the computer to develop a calibration curve for each probe using the least squares curve fitting method. These calibration curves, plotted in mils versus digital count, are entered into the controller, along with an acceptable range of digital counts corresponding to the dimensional design tolerance in each case. The controller can then operate on a stand-alone basis to monitor the digital signal count developed by each probe to determine if it falls within the appropriate acceptable count range. If all the probe measurements are determined to be within design tolerance, controller 98 controls an air cylinder 102 to position a sorter 104 with its trough 108 aligned beneath and forwardly of arbor 84. Pick and place mechanism 68 is activated to grip the gauged ferrule and extract it from the arbor. Once clear of the arbor, its hands 76 are separated, releasing the accepted ferrule to fall into trough 108. From this trough, the accepted ferrules are routed by suitable means (not shown) to downstream equipment for further processing. On the other hand, if any probe measurement is determined to be out of design tolerance, sorter trough 106 is positioned to catch the rejected ferrule as it is extracted from the arbor and dropped by the pick and place mechanism. From this reject trough, the ferrules are directed to a suitable container (not shown) available for visual inspection and manual gauging, if appropriate, and eventual disposal.

It will be noted that the pick and place mechanism extracts a ferrule from gauging fixture 82, releases it to sorter 104, and retrieves the next ferrule waiting in the pickup position in one continuous straight line motion, thus saving time. Enroute, hands 76 separated to drop the ferrule into the sorter, and thus they are prepared to close on and grip the next ferrule upon arrival at the pickup position.

It will be appreciated that while the present invention has been disclosed in its embodiment for quality assurance inspection of the dimensional characteristics of nuclear fuel rod spacer ferrules, the principles of operation may be applied to checking the dimensional integrity of a variety of formed parts on an automated production line basis.

From the foregoing description, it is seen that the objects set forth above, including those made apparent herein, are efficiently attained, and, since certain changes may be made in the construct described in the specification and illustrated in the drawings without departing from the invention, it is intended that all matters contained herein be taken as illustrative and not in a limiting sense.

Having described the invention, what is claimed as new and desired to secure by Letters Patent is:

1. Automated gauging apparatus for measuring the radial spacing between first and second sites on the inner and outer surfaces, respectively, of a tubular part, said radial spacing constituting a critical dimension of a surface feature formed in the part sidewall, said apparatus comprising, in combination:
   A. an orienting station automatically operating to manipulate successive parts to a predetermined orientation at a pickup position;
   B. a gauging fixture including
      (1) an arbor for insertion into the bore of the part and having a reference surface,
      (2) means carried by said arbor for radially biasing the part to a gauging position with said first site bearing against said reference surface,
      (3) a sensor block located adjacent said arbor, and
      (4) a sensor mounted in fixed relation to said reference surface by said block for generating an output signal indicative of the sensor position relative to said second site and thus the critical dimension of the radial spacing between said first and second sites,
   C. means for processing said output signal to determine if the critical dimension is within tolerance limits; and
   D. means for transferring successive parts from said pickup position to said arbor.

2. The automated gauging apparatus defined in claim 1, which further includes a sorter controlled by said signal processing means to separate parts having an acceptable critical dimension from those having an unacceptable critical dimension.

3. The automated gauging apparatus defined in claim 2, wherein said transferring means extracts each gauge part from said arbor for deposit in said sorter enroute to picking up the next part to be gauged from said pickup position.

4. The automated gauging apparatus defined in claim 3, wherein each part includes plural, distinct surface formations, said arbor having a reference surface against which said first site of each surface formation is biased by said radial biasing means, and a separate said sensor respectively mounted by said block in fixed relation to said arbor reference surfaces for generating an output signal indicative of its position relative to said second site of each surface feature and thus the critical dimension of the radial spacing between said first and second sites of each said feature, said signal processing means separately processing said sensor output signals to determine if the critical dimensions of the plural surface features are all within tolerance limits.

5. The automated gauging apparatus defined in claim 3, wherein each part includes a reference notch formed in one edge thereof, said orienting station including
   (1) means for rotating each successive part about its axis while axially translating the part toward said pickup position,
   (2) a first retractable pin positioned in intercepting relation with the part leading edge,
   (3) an inverting mechanism, and
   (4) a detector signalling said first pin to retract in response to said first pin finding the reference notch, and said detector, in response to the failure of said first pin to find the reference notch, signalling said inverting mechanism to invert the part end for end and said first pin to retract, whereby the part always proceeds to said pickup position, notched edge first.

6. The automated gauging apparatus defined in claim 5, wherein said orienting station further includes a second retractable pin located at said pickup position in intercepting relation with the part leading edge, said second pin lodging in the notch therein to halt axial rotation of the part thereby establish the part in said pickup position in a predetermined angular orientation for pickup by said transferring means.

7. The automated gauging apparatus defined in claim 6, wherein said part rotating and translating means comprises a pair of elongated, parallel spaced, counter-rotating rollers inclined toward said pickup position, the part being supported on said rollers.

8. Automated gauging apparatus for measuring the respective heights of nuclear fuel rod-positioning stops formed as inwardly projecting dimpled sidewall portions of tubular ferrules included in fuel bundle spacers, said apparatus comprising, in combination:
   A. an orienting station automatically operating to manipulate successive ferrules to a predetermined orientation at a pickup position;
   B. a gauging fixture including
      (1) an arbor for insertion into the ferrule bore and having plural reference surfaces,
      (2) means carried by said arbor for radially biasing the ferrule to a gauging position with the fuel rod-positioning stop surfaces bearing against said reference surfaces,
      (3) a sensor block located adjacent said arbor, and
      (4) a plurality of sensors mounted by said block in respective fixed relation to said references surfaces for generating output signals indicative of the sensor positions relative to sites on the ferrule peripheral surface adjacent the stops and thus the heights of the stops measured from the peripheral surfaces sites to the fuel rod positioning stop surfaces;
   C. means for separately processing said output signals to determine if the stop heights are all within tolerance limits; and
   D. means for transferring successive ferrules from said pickup position to arbor.

9. The automated gauging apparatus defined in claim 8, which further includes a sorter controlled by said signal processing means to separate ferrules having acceptable stop height dimensions from those having unacceptable stop height dimensions.

10. The automated gauging apparatus defined in claim 9, wherein said transferring means extracts each gauged ferrule from said arbor for deposit in said sorter enroute to picking up the next ferrule to be gauged from said pickup position.

11. The automated gauging apparatus defined in claim 10, wherein each ferrule includes a pair of angularly spaced stops adjacent each ferrule end, said gauging fixture including four sensors, one for measuring the height of each respective stop.

12. The automated gauging apparatus defined in claim 11, wherein said gauging fixture includes three additional sensors mounted by said block in longitudinal alignment for detecting any lack of ferrule cylindrically.

13. The automated gauging apparatus defined in claim 11, wherein each ferrule includes a reference notch formed in one edge thereof, said orienting station including
- (1) means for rotating each successive ferrule about its axis while axially translating the ferrule toward said pickup position,
- (2) a first retractable pin positioned in intercepting relation with the ferrule leading edge,
- (3) an inverting mechanism, and
- (4) a detector signalling said first pin to retract in response to said first pin finding the reference notch, and said detector, in response to the failure of said first pin to find the reference notch, signalling said inverting mechanism to invert the ferrule end for end and said first pin to retract, whereby the ferrule always proceeds to said pickup position, notched edge first.

14. The automated gauging apparatus defined in claim 13, wherein said orienting station further includes a second retractable pin located at said pickup position in intercepting relation with the ferrule leading edge, said second pin lodging in the notch therein to halt axial rotation of the ferrule, thereby establish the ferrule in said pickup position in a predetermined angular orientation for pickup by said transferring means.

15. The automated gauging apparatus defined in claim 14, wherein said ferrule rotating and translating means comprises a pair of elongated, parallel spaced, counter-rotating rollers inclined toward said pickup position, the ferrule being supported on said rollers.

16. The automated gauging apparatus defined in claim 10, wherein said sensors are eddy current probes.

* * * * *

UNITED STATES PATENT AND TRADEMARK OFFICE
CERTIFICATE OF CORRECTION

PATENT NO. : 4,946,587
DATED : AUGUST 7, 1990
INVENTOR(S) : James W. Reeves, Harold B. King, Jr., William M. Childers It is certified that error appears in the above—identified patent and that said Letters Patent is hereby corrected as shown below:

On the title page

Omission of fourth inventor:

ADD: Freddie E. Turner

Signed and Sealed this

Seventeenth Day of December, 1991

Attest:

HARRY F. MANBECK, JR.

Attesting Officer   Commissioner of Patents and Trademarks